(12) United States Patent
Manico et al.

(10) Patent No.: US 7,170,557 B2
(45) Date of Patent: Jan. 30, 2007

(54) MODULAR DIGITAL IMAGING SYSTEM

(75) Inventors: Joseph A. Manico, Rochester, NY (US); John R. Fredlund, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 708 days.

(21) Appl. No.: 10/393,834

(22) Filed: Mar. 21, 2003

(65) Prior Publication Data

US 2003/0210333 A1   Nov. 13, 2003

Related U.S. Application Data

(60) Provisional application No. 60/367,586, filed on Mar. 26, 2002.

(51) Int. Cl.
*H04N 5/222* (2006.01)

(52) U.S. Cl. .................. 348/333.07; 348/333.06; 348/373

(58) Field of Classification Search ........... 348/373, 348/207.1, 207.2, 333.01, 333.06, 333.07
See application file for complete search history.

(56) References Cited

U.S. PATENT DOCUMENTS

| | | | | |
|---|---|---|---|---|
| 5,156,556 A | * | 10/1992 | Ma | 439/357 |
| 5,493,335 A | | 2/1996 | Parulski et al. | |
| 5,667,399 A | * | 9/1997 | Jackson et al. | 439/341 |
| 5,909,248 A | * | 6/1999 | Stephenson | 348/373 |
| 5,909,357 A | * | 6/1999 | Orr | 361/687 |
| 5,984,732 A | * | 11/1999 | Mehring | 439/701 |
| 6,043,625 A | | 3/2000 | Dowe | |
| 6,081,207 A | * | 6/2000 | Batio | 341/20 |
| 6,292,218 B1 | | 9/2001 | Parulski et al. | |
| 6,552,743 B1 | * | 4/2003 | Rissman | 348/207.2 |
| 6,661,648 B2 | * | 12/2003 | Dayley | 361/683 |
| 6,678,747 B2 | * | 1/2004 | Goossen et al. | 710/2 |
| 6,693,665 B1 | * | 2/2004 | Shindo et al. | 348/207.2 |
| 6,698,851 B1 | * | 3/2004 | Ludl | 312/108 |
| 6,886,056 B2 | * | 4/2005 | Ohmura | 710/62 |
| 6,950,142 B2 | * | 9/2005 | Soumi et al. | 348/375 |
| 2001/0034803 A1 | * | 10/2001 | Sorek et al. | 710/129 |
| 2002/0071035 A1 | * | 6/2002 | Sobol | 348/207 |
| 2002/0176020 A1 | * | 11/2002 | Kawaguchi et al. | 348/373 |
| 2002/0186319 A1 | * | 12/2002 | Whitby et al. | 348/375 |

OTHER PUBLICATIONS

U.S. Appl. No. 10/287,728 entitled A System for Capturing and Archiving Motion Video Segments filed Nov. 4, 2002 and provisionally filed Mar. 26, 2002 in the name of Manico, et al.

* cited by examiner

*Primary Examiner*—Ngoc-Yen Vu
*Assistant Examiner*—Gary C. Vieaux
(74) *Attorney, Agent, or Firm*—Thomas J. Strouse

(57) ABSTRACT

A modular digital imaging system adapted to transfer digital images. In one embodiment, the system includes a plurality of modules which are stackable to form a customizable unit. A first one of the plurality of modules provides a first function and has a first electrical connector and at least one attachment member. A second one of the plurality of modules provides a second function different than the first function and has a second electrical connector matable with the first electrical connector. The second module further comprises at least one attachment feature complementing the attachment member whereby the at least one attachment member mates with the at least one attachment feature to securely attach the first and second modules when the first and second modules are stacked. The electrical connector is employed to transfer the digital images between modules when securely attached.

46 Claims, 15 Drawing Sheets

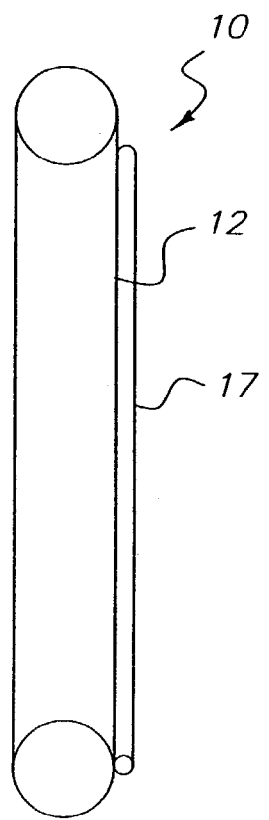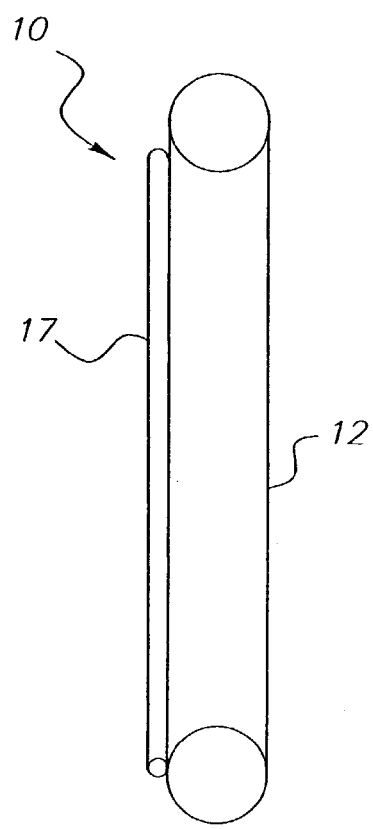
*FIG. 20*
*FIG. 21*
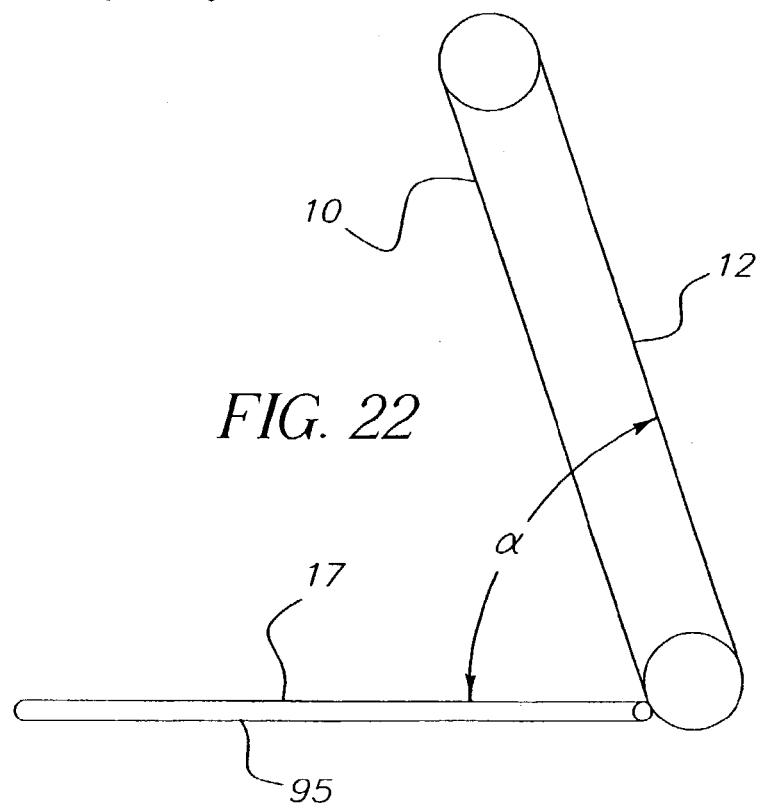
*FIG. 22*

MODULAR DIGITAL IMAGING SYSTEM

CROSS REFERENCE TO RELATED APPLICATION

Priority is claimed from Provisional Application U.S. Ser. No. 60/367,586 filed on Mar. 26, 2002, entitled "MODULAR DIGITAL IMAGING SYSTEM".

FIELD OF THE INVENTION

The present invention relates generally to digital imaging, and more particularly, to a digital imaging system.

BACKGROUND OF THE INVENTION

Digital imaging systems are well known and include, for example, digital image capture devices, digital cameras, digital displays, camcorders, digital video recorders, computers, and kiosks.

Current digital cameras can connect to a host computer by means of a dock in order to transfer digital data to a computer. This digital data can include digital still images (e.g., JPEG files) as well as motion video files (e.g., Quick Time files). One example is the Kodak EasyShare DX3600 digital camera, which is sold with an optional docking unit. The camera captures digital still images and motion video segments, and stores the images using Flash EPROM memory. The still images and motion video files can be downloaded from the digital camera to the computer using the docking unit.

While such a digital camera has achieved a certain degree of success in its particular applications, there is a need for a digital imaging system which is modular, transportable, and which can be employed to share/transmit/archive/print/display digital images with or without the use of a computer.

SUMMARY OF THE INVENTION

An object of the present invention is to provide a digital imaging system which is modular, transportable, and can share digital images with or without the employment of a computer.

Another object of the present invention is to provide integrated encasements to protect the delicate electronic components of the system.

Yet another object of the present invention is to provide a variety of modular components that can be combined by a user to form a custom product that has the appearance and function of an integrated system. Additionally, the invention provides a manner of reducing the wires and complexity of external connection means between components.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided a modular digital imaging system adapted to transfer digital images. The system includes a plurality of modules which are stackable to form a customizable unit. A first one of the plurality of modules provides a first function and has a first electrical connector and at least one attachment member. A second one of the plurality of modules provides a second function different than the first function and has a second electrical connector matable with the first electrical connector. The second module further comprises at least one attachment feature complementing the attachment member whereby the at least one attachment member mates with the at least one attachment feature to securely attach the first and second modules when the first and second modules are stacked. The electrical connector is employed to transfer the digital images between modules when securely attached.

According to another aspect of the invention, there is provided a modular digital imaging system adapted to transfer digital images. The system includes a plurality of modules, which are stackable to form a customizable unit. A first one of the plurality of modules provides a first function and includes a first electrical connector and at least one locating member. A second one of the plurality of modules provides a second function different than the first function and includes a second electrical connector matable with the first electrical connector. The second module further comprises at least one locating feature complementing the locating member whereby the at least one locating member mates with the at least one locating feature to position the first and second modules in a stack. The electrical connector is employed to transfer the digital images between modules when stacked.

According to a further aspect of the invention, there is provided a modular digital imaging device, comprising: a body including a first side having a first shape and a second side having a second shape, the first shape being complementary to the second shape; a functional member disposed within the body providing a function accessible from a third side different than the first and second side; an electrical connection portion adapted to support electrical operation of the modular imaging device and electrically connect the modular imaging device to another modular imaging device; and at least one alignment member disposed on the first side for aligning the modular imaging device with another modular imaging device.

BRIEF DESCRIPTION OF THE DRAWINGS

The foregoing and other objects, features, and advantages of the invention will be apparent from the following more particular description of the preferred embodiments of the invention, as illustrated in the accompanying drawings.

FIG. 20 shows a side view of the display device with the cover member covering the display.

FIG. 21 shows a side view of the display device with the cover member folded back away from the display so as to be positioned adjacent a side opposite the display.

FIG. 22 shows the cover member supporting the display device in the display mode.

DETAILED DESCRIPTION OF THE INVENTION

Figure 1:
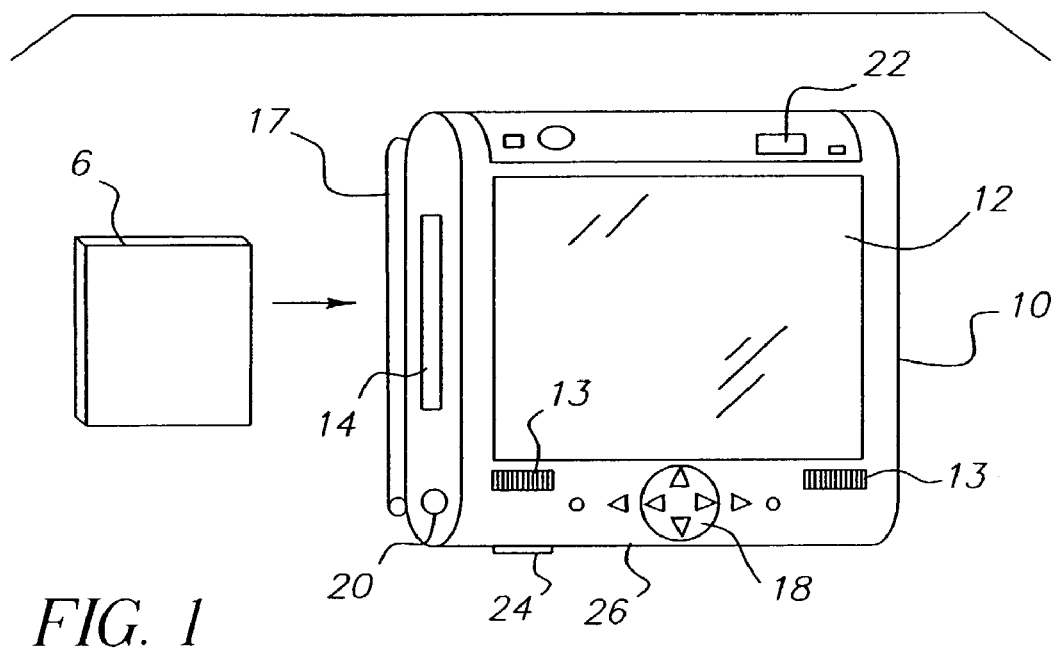
FIG. 1 shows a perspective view of a display device in accordance with the present invention.

The following is a detailed description of the preferred embodiments of the invention, reference being made to the drawings in which the same reference numerals identify the same elements of structure in each of the several figures.

Reference is made to commonly assigned application U.S. Ser. No. 10/287,728 entitled "A SYSTEM FOR CAPTURING AND ARCHIVING MOTION VIDEO SEGMENTS", filed on Nov. 4, 2002 and provisionally filed on Mar. 26, 2002 in the names of Manico et al, and which is assigned to the assignee of this application.

FIG. 1 shows a display device 10 in accordance with the present invention. Display device 10 comprises an image display 12 for displaying a digital image, and a receiving port 14 for receiving a digital data storage device 16. In FIG. 1, receiving port 14 is configured as a slot/aperture adapted to receive a digital storage device 16, such as a floppy disk, memory card, memory stick or CD. Image display 12 can be a color LCD, an organic light emitting display (OLED), or the like, as known to those skilled in the art. Accordingly, display device 10 can display motion video images and still digital images. Display device 10 preferably comprises at least one speaker 13.

Display device 10 can comprise a cover member 17, which is shown in FIG. 1 as being folded back away from display 12 to abut a side of display device 10 opposite display 12.

Display device 10 further comprises at least one selection member 18 for selecting and manipulating (e.g., zoom, crop, delete) a digital image displayed on display 12. FIG. 1 illustrates a plurality of selection members, shown as buttons, arrows, and a four-way selection button, which can be employed to provide instructions to display device 10 to display a digital image on display 12. Display 12 can be configured as a touch screen. Accordingly, a physical contact with display 12 would be used to select or provide instructions to display device 12. The physical contact with display 12 can be accomplished, for example, by a finger contacting display 12, or a stylus. A stylus can be provided with display device 10 and stored in an aperture 20 disposed in display device 10 for ready access by a user.

It is recognized that display device 10 can be an image capture device, such as a digital camera, video recorder, or camcorder, adapted to capture digital images, sound, and motion video images in addition to displaying digital images and motion video images. If display device 10 is configured as an image capture device, display device 10 would further comprise a flash member or other illumination device 22 as well as a lens and an activation member for activating display device 10 to capture an image. Still further, it is understood that display device 10 would then further include elements employed for image capture and image processing, such as an image sensor (e.g., CCD, CMOS), analog-to-digital converter, and digital image processor. An example of a digital camera which could be employed as display device 10 is disclosed in U.S. Pat. No. 6,292,218, issued Sep. 18, 2001, titled "Electronic camera for initiating capture of still images while previewing motion images", by Parulski et al, herein incorporated by reference.

Display device 10 can further comprise a communication port 24 for communicating with another device. Communication port 24 is shown in FIG. 1 as a USB connection disposed on a lower edge 26 of display device 10.

Figure 2:
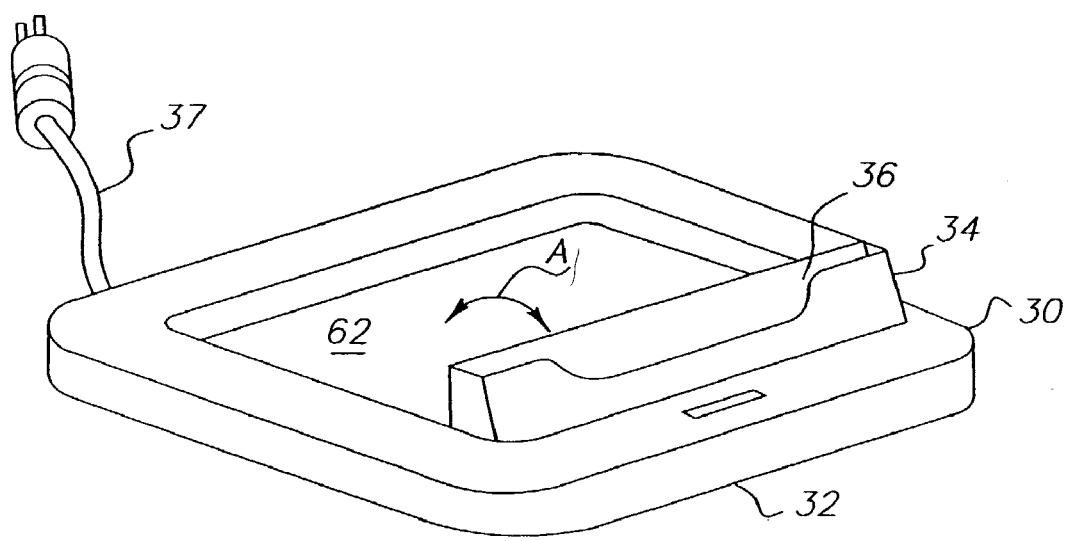
FIG. 2 shows a perspective view of a display module in accordance with the present invention.

Referring now to FIG. 2, there is shown a perspective view of a first module referred to, for ease of discussion, as a display dock or display module 30. Display module 30 comprises a body 32 and a support member 34 pivotably connected to body 32 so as to pivot in a direction as shown by arrow A in FIG. 2. The pivoting operation may be achieved by manual manipulation by the user or by a motor (not shown). Support member 34 comprises a recess 36 adapted to receive and support display device 10. When display device 10 is positioned in recess 36 and pivoted in a full horizontal position, display device 10 is encased by display module 30 in a display recess 62 and is protected by display module 30. Display module 30 can further comprise an electrical connector 37.

Figure 3:
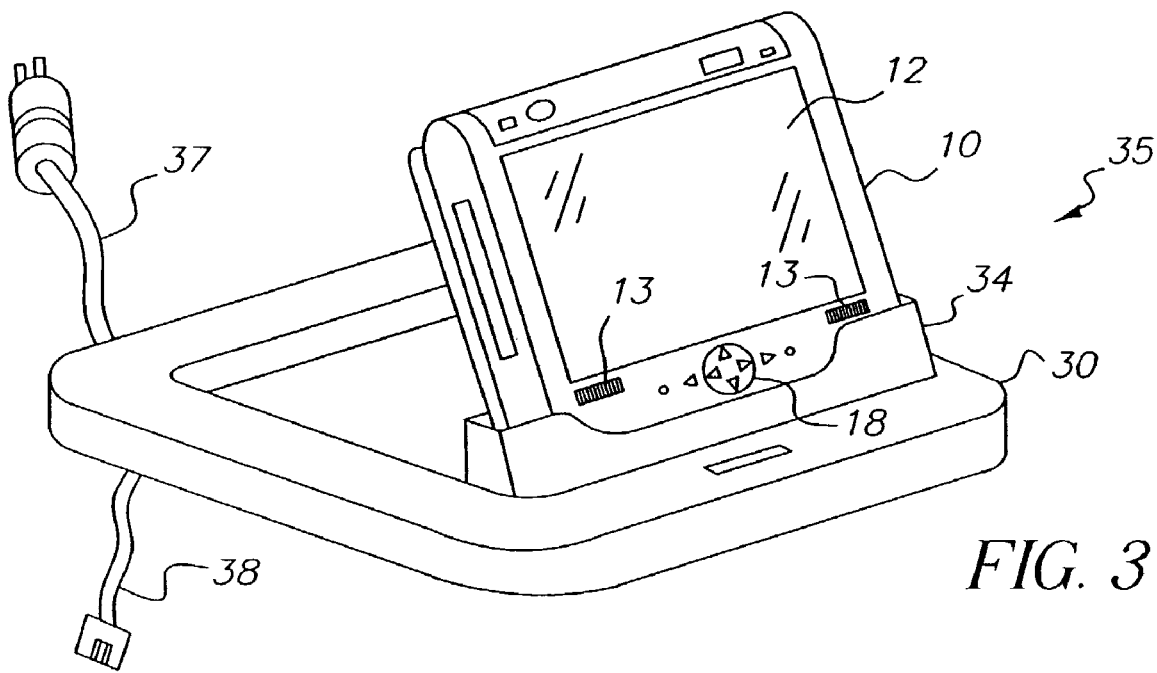
FIG. 3 shows a perspective view of a digital imaging system in accordance with the present invention comprising the display device shown in FIG. 1 and the display module shown in FIG. 2.

FIG. 3 shows display device 10 disposed within display module 30 to define a digital imaging system 35 in accordance with the present invention. As shown, lower edge 26 is inserted into recess 36 such that the portion of display device 10 adjacent lower edge 26 is supported within support member 34, permitting an unobstructed view of display 12 of display device 10. That is, an image displayed in displayed 12 can be viewed while display device 10 is docked within display module 30; display 12 is not obstructed from a user's view. Similarly, speakers 13 are unobstructed by support member 34 so as not to interfere with sound reproduction. Alternatively, display module 30 and support member 34 may be designed to incorporate sound directing ports and/or baffles to enhance the quality of the sound. Display module 30 acts as a holder or support for display device 10. Support member 34 can be pivoted to provide a preferred viewing angle of display 12 by a user. In a preferred embodiment, selection members 18 are accessible when display device 10 is supported by display module 30.

If display module 30 is provided with electrical connector 37, display module can be configured as a power source for display device 10 or as a charger for a power supply (e.g., battery) disposed within display device 10. Additionally, display recess 62 in display module 30 may incorporate an additional connector for charging additional batteries.

Disposed within recess 36 is a communication connector (not shown) which can be matingly connected with communication port 24 of display device 10 when display device 10 is docked within display module 30. When docked, a communication network is established by connecting communication port 24 and the communication connector, thereby permitting the transfer of digital data. For example, display module 30 can comprise a modem and a telephone connector 38 (shown in FIG. 3), whereby digital data can be transmitted by means of a telephone connection. It is recognized that other communication networks known to those skilled in the art can be employed in addition to a wired communication network, for example, a cellular or wireless communication network. An example of a wireless communication network is a radio frequency transponder and receiver disposed with display device 10 and display module 30.

Figure 4:
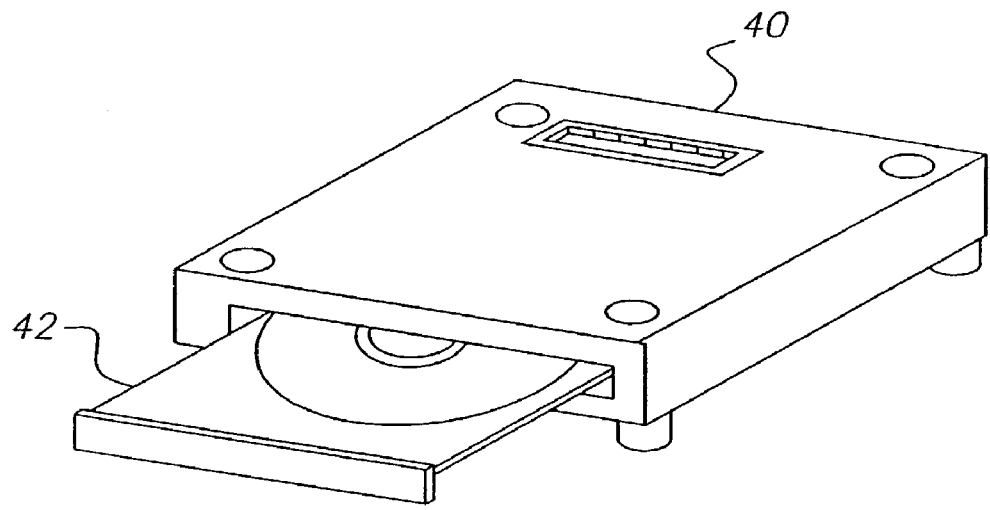
FIG. 4 shows a perspective view of a CD module.
Figure 5:
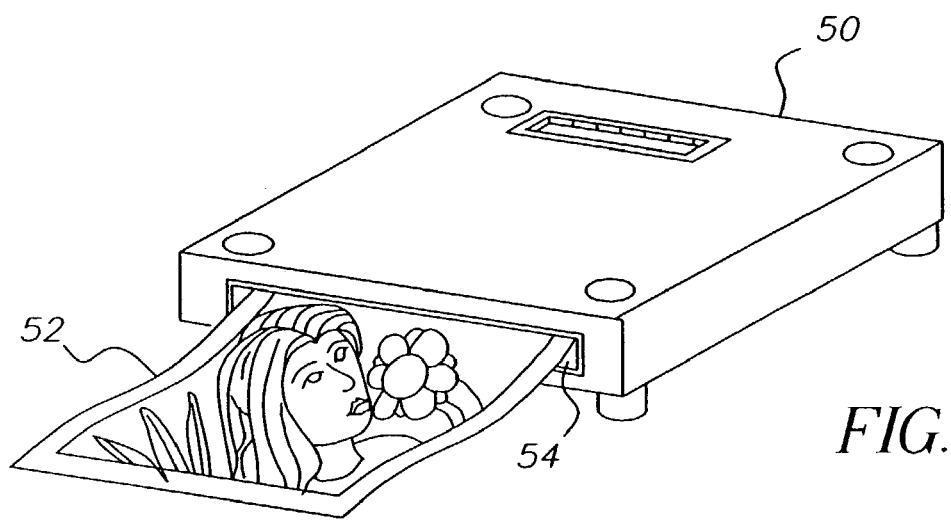
FIG. 5 shows a perspective view of a printer module.

Display module 30 is one example of a module that can be employed with display device 10. Additional modules can be employed with display device 10. A compact disc (CD) module 40 is shown in FIG. 4 as having an opening 42 through which to receive a CD for reading or writing to the CD, and a printer module 50 is shown in FIG. 5 for providing a hardcopy print 52 through a delivery aperture 54.

Figure 6:
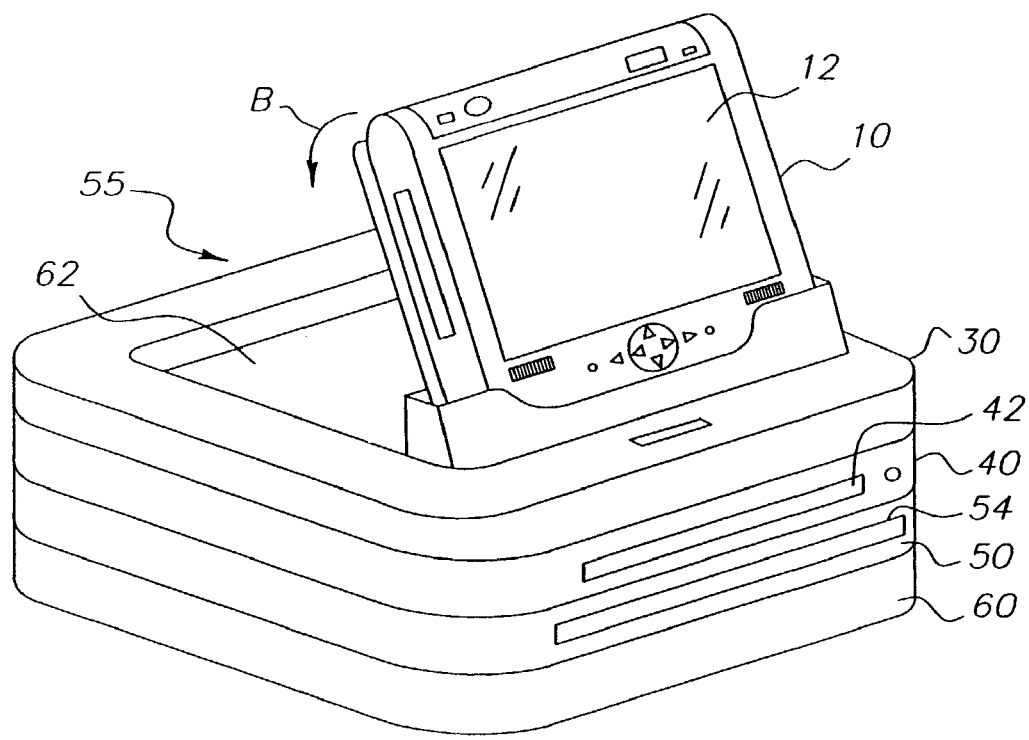
FIG. 6 shows a perspective view of a modular digital imaging system in accordance with the present invention.

Each module is configured to have a complementary shape such that when the modules abut, a modular system is provided. FIG. 6 generally illustrates a perspective view of a modular digital imaging system 55 in accordance with the present invention comprising display module 30 and at least one other module. The particular digital imaging system 55 shown in FIG. 6 comprises display module 30, CD module 40, printer module 50, and another module 60. Examples of other modules 60 include a DVD module for reading or writing DVDs, a telecommunication module (cellular, wired, or wireless), a videophone module, a stereo module for providing amplified stereo sound and high quality speakers, a battery pack module (for example, comprising a heavy duty battery for providing extended operation of the digital imaging system without recharging or connection to an electrical outlet), a hard drive module, a modem module, a television turner module, a digital tape drive module, computer connection module, illumination module, digital projector, film writer, film or print scanner, and an additional memory module.

Module 60 can be a "dummy" module. That is, it can be a decorative, functional, or non-functional module. For example, it can be a storage module having a recessed area for storage for batteries, cabling, manuals, print media, memory cards, CDs, or the like. Alternatively, the dummy module may serve as a base to raise the digital imaging system to a particular height for preferred viewing by a user. Alternatively, a transformer for providing electrical power can be disposed within a dummy module.

As configured, the modules are docking docks. That is, when a module is docked with another module, a system of docks is formed. The complementary shapes of the modules provides for an interlocking arrangement of the modules, which in addition to being aesthetically pleasing, provides a physically robust digital imaging system.

The modules can be arranged in a vertical orientation, as shown in FIG. 6. Alternatively, the modules can be arranged in a horizontal orientation with display device 10 being disposed on top of or adjacent to one of the modules.

With a modular system, the order of the modules is not relevant; any order can be employed, though in a preferred embodiment display device 10 is disposed on top for optimal viewing.

Access to the modules (e.g., 30, 40, 50, 60) is preferably in the same direction (i.e., on the same side) of digital imaging system 55, as shown in FIG. 6. Preferably, opening 42 of CD module 40 and delivery aperture 54 of printer module 50 are directed toward the viewer, so as to provide ready access to the modules. Likewise, display 12 is preferably arranged so as to be viewed forward regardless of lens orientation, in the same direction as the access to the modules, for viewing an image through display 12 when display device 10 is docked in display module 30. It may be preferred to orient the lens toward the user whenever the display device is inserted in display module 30 to facilitate two way visual communication. Similarly, access for any media (i.e., paper for printer module 50) would preferably be obtained from the same forward direction.

Figure 7:
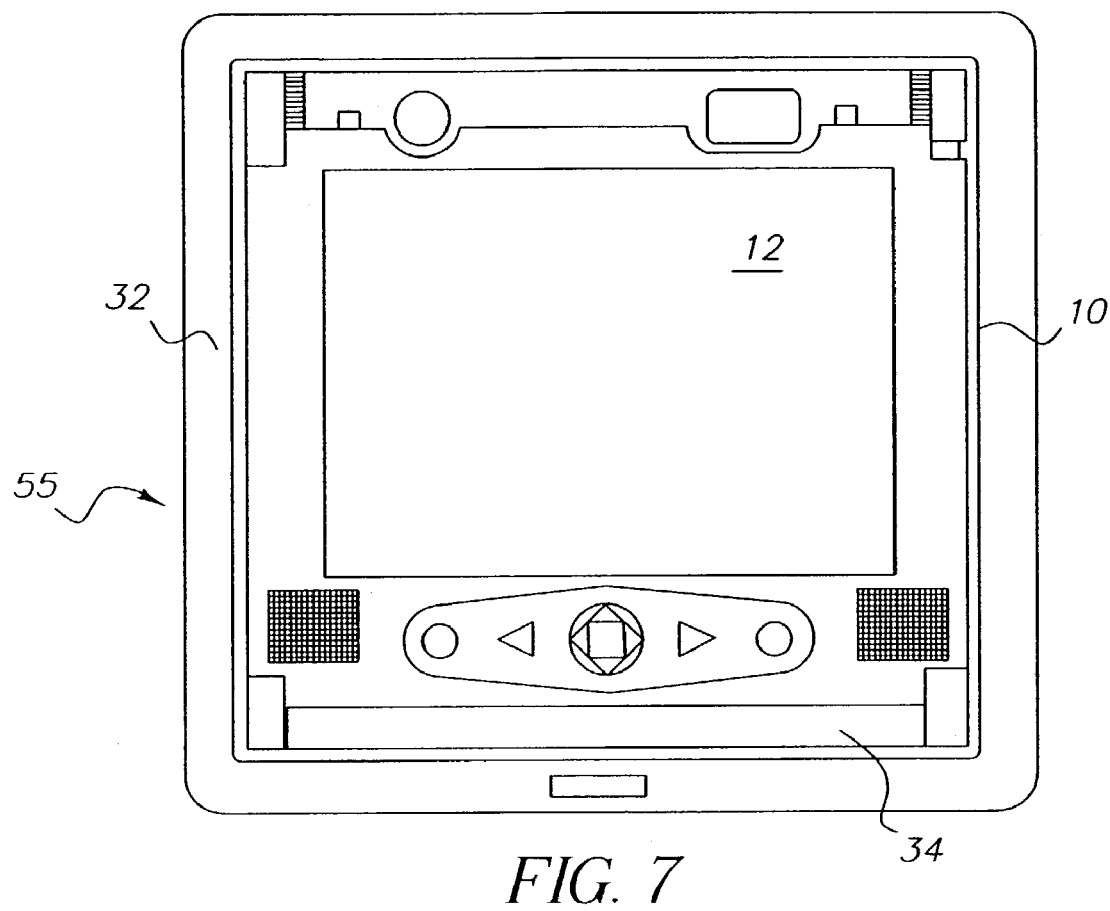
FIG. 7 shows a top view of the digital imaging system of FIG. 6 when the display device is folded back into a display recess.
Figure 8:
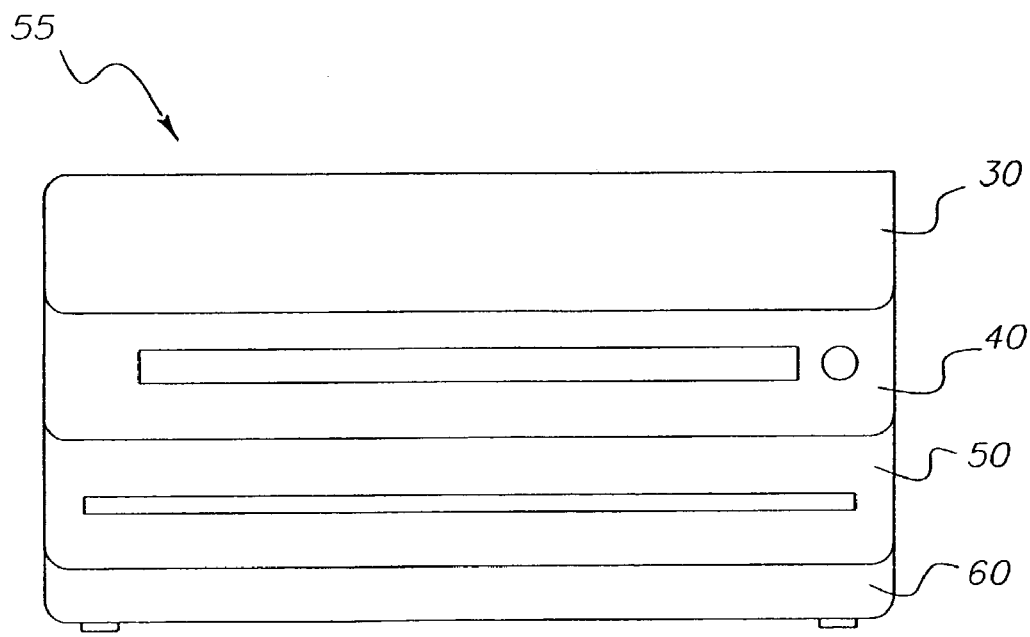
FIG. 8 shows a front view of the digital imaging system shown in FIG. 7.

Referring again to FIG. 6, display module 30 comprises a display recess 62. Support member 34 can be pivoted toward display recess 62, in the direction shown by arrow B, such that display device 10 is fully housed within display recess 62 with display 12 facing outward. FIG. 7 shows a top view of digital imaging system 55 when display device 10 is housed within display recess 62, and FIG. 8 shows a corresponding front view of digital imaging system 55. In this position, display device 10 is protected from being bumped or jarred, and could be transported in this configuration.

Figure 9:
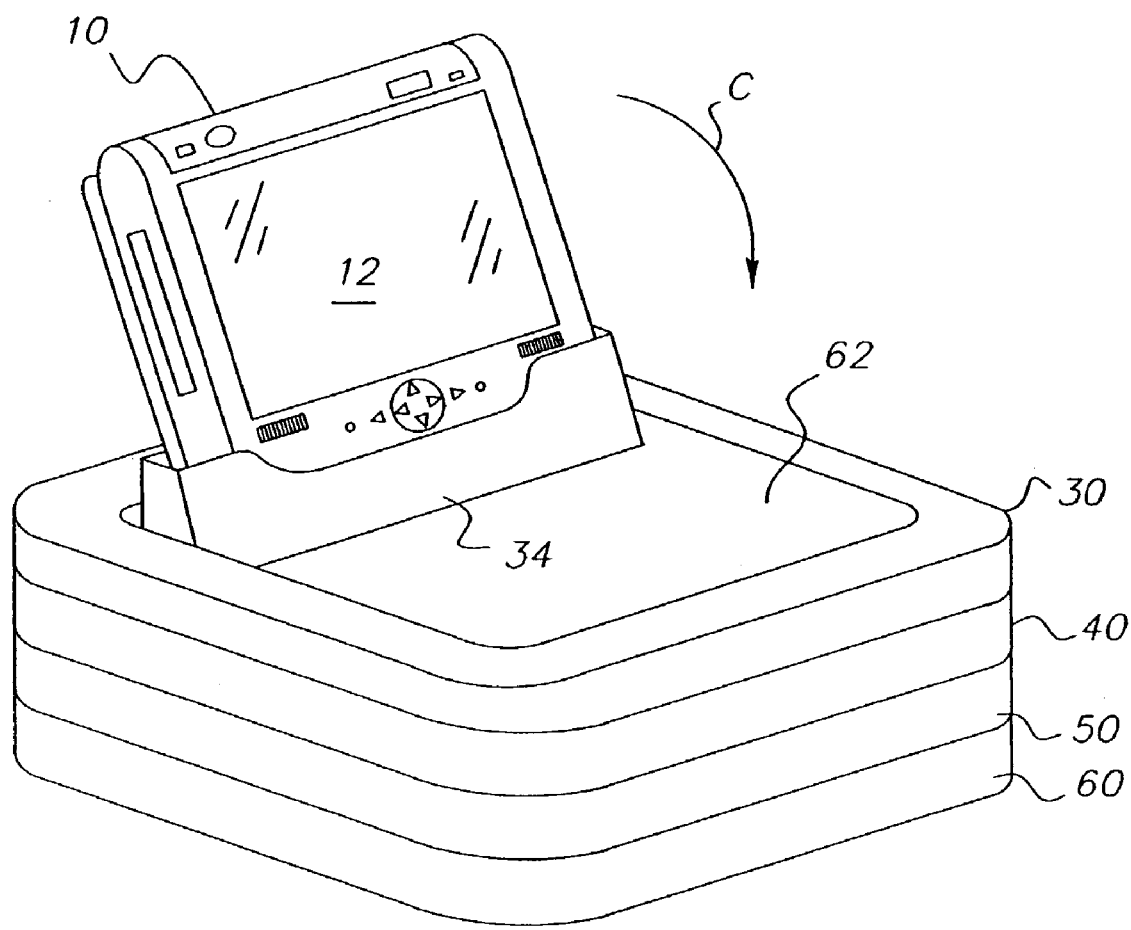
FIG. 9 shows an alternate arrangement of the support member within the display module.

FIG. 9 shows an alternate arrangement wherein support member 34 is pivoted in a direction shown by arrow C, such that when display device 10 is fully housed within display recess 62, display 12 is facing inward. In this position, display device 10 and display 12 are protected from being bumped or jarred, such as during transport. In a further embodiment, support member 34 may be translated between the two positions shown in FIGS. 6 and 9 so that a user can alternate housing display device 10 within display recess 62 with display 12 facing inward or outward.

Figure 10:
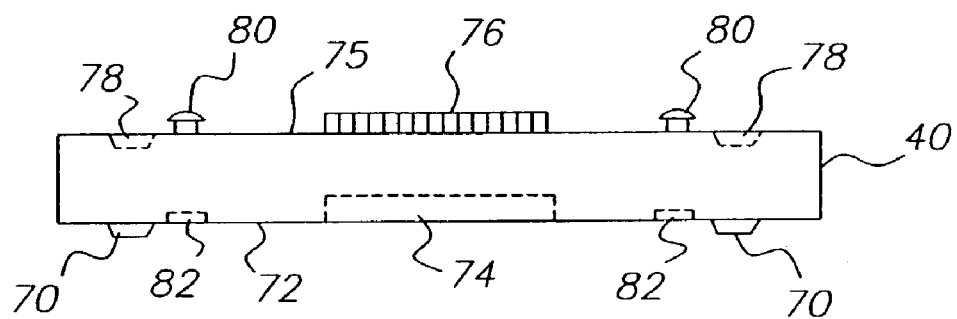
FIG. 10 shows a side view of a module in accordance with the present invention.
Figure 11:
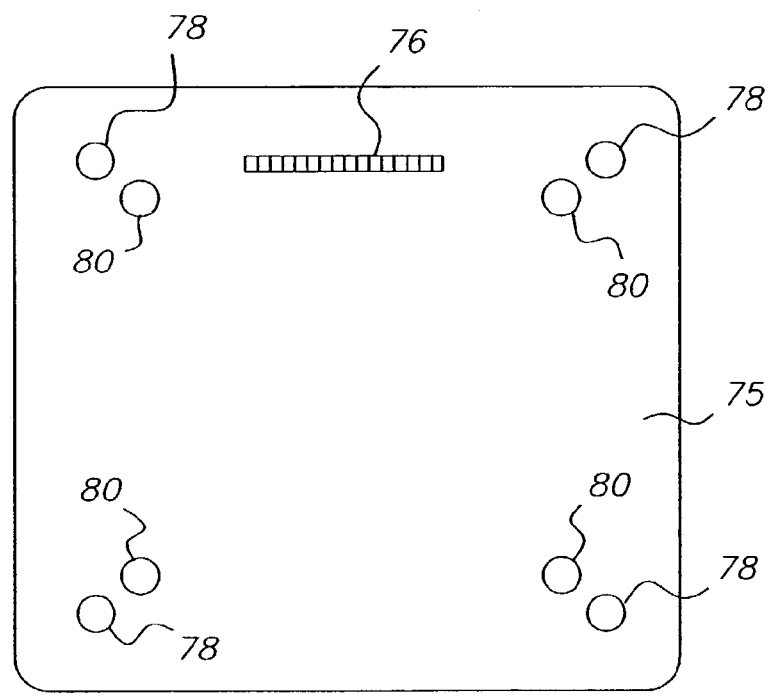
FIG. 11 shows a top view of the module of FIG. 10.
Figure 12:
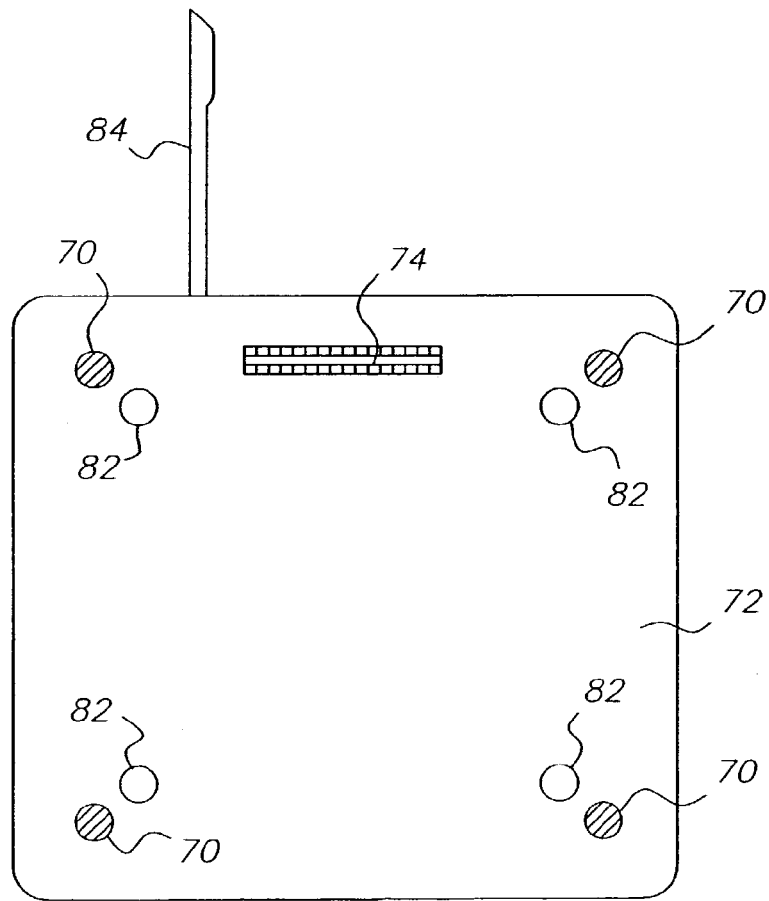
FIG. 12 shows a bottom view of the module of FIG. 10 with the module being in an unlocked position.
Figure 13:
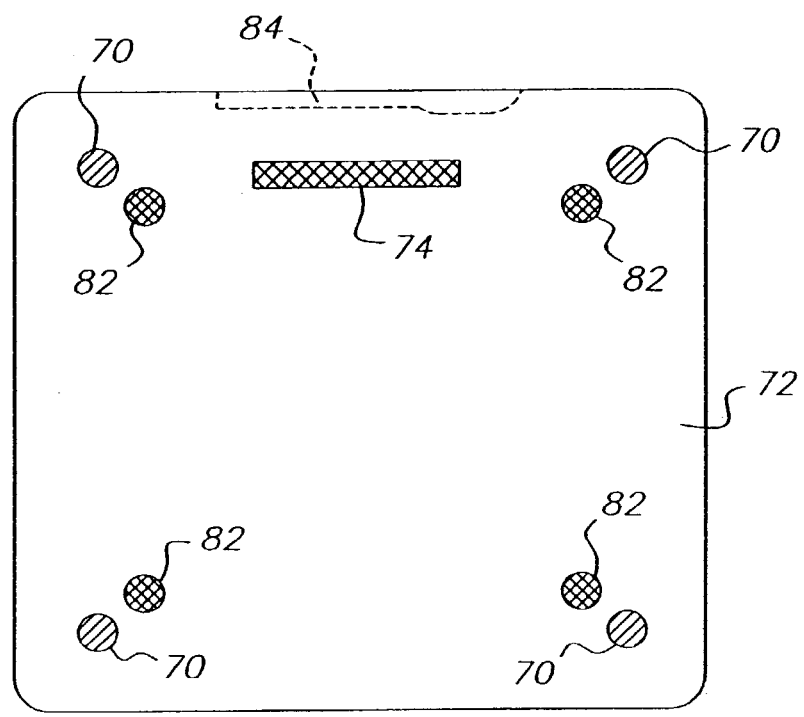
FIG. 13 shows a bottom view of the module of FIG. 10 with the module being in a locked position.

As aforementioned, the order of the modules is irrelevant since they are configured to be interchangeable. Referring now to FIGS. 10 through 14, the configuration of the modules (i.e., 40, 50, 60) is described with regard to their interchangeability. For ease of discussion reference is made to CD module 40 though, as indicated, 50, 60 have the same configuration. Note that the configuration for the modules need only be the same at the interface, and may be different in thickness and shape as necessary to accommodate their function. FIG. 10 shows a front view of CD module 40. FIG. 11 shows a top view of CD module 40. FIG. 12 shows a bottom view of CD module 40 with the module being in an unlocked position. While FIG. 13 shows a bottom view of CD module 40 with the module being in a locked position.

Figure 14:
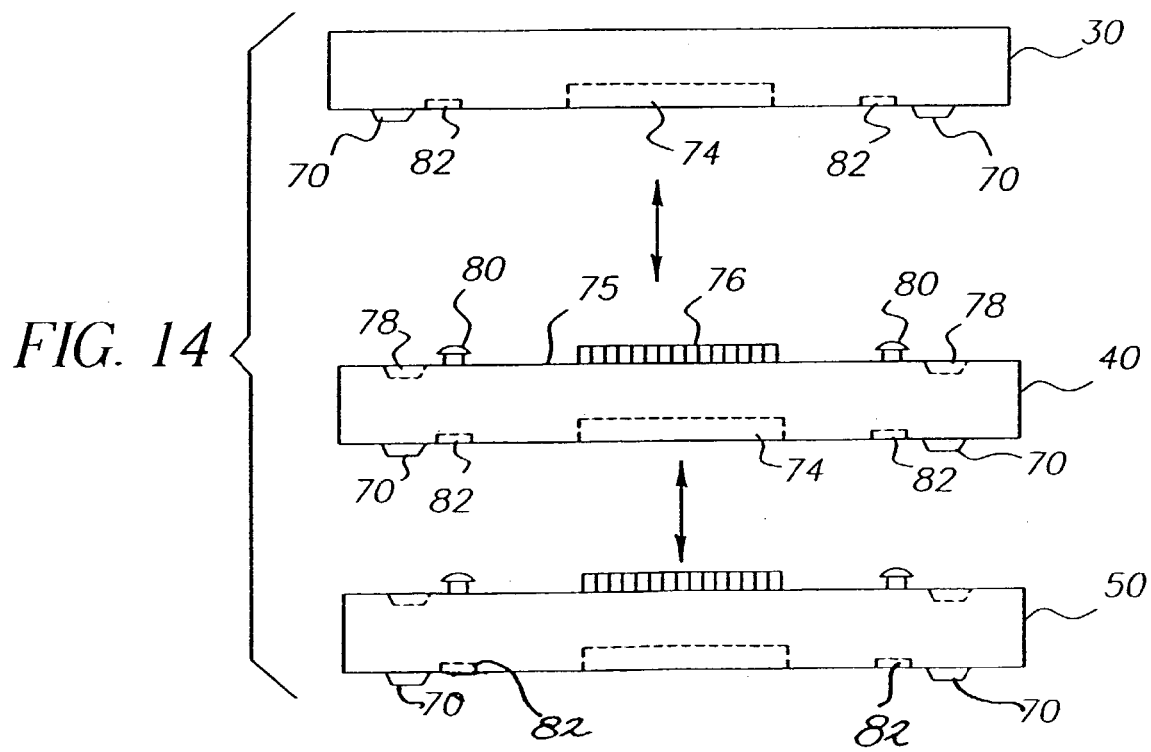
FIG. 14 shows a side view of several modules in a stacking arrangement.

CD module 40 comprises a plurality of support members or footers 70 disposed on a bottom side 72, as well as a female electrical connection portion 74. Disposed on a top side 75 of CD module 40 is a male electrical connection portion 78 adapted to mate with female portion 74 of an abutting module (for the particular example, display module 30, best shown in FIG. 14). Also disposed on top side 75 of CD module 40 are a plurality of footer receiving areas or detents 78 adapted to receive footers 70 of the abutting module (for the particular example, display module 30, as best shown in FIG. 14). The footers therefore provide both a locating and locking feature/function. Additionally, the footers may be constructed of an elastic material such as polyurethane capable of compression and capable of providing high friction. The compression may aid in the locking mechanism by providing spring action. The function of the footers when docked is to provide alignment and shock absorption. When not docked, the footers provide non-slip contact with the other surfaces and shock absorption. Further disposed on top side 75 is at least one attachment member 80 adapted to secure the modules. Attachment member 80 of CD module 40 mates with an attachment opening 82 disposed in bottom side 72 of an abutting module (for the particular example, display module 30, best shown in FIG. 14). Attachment members 80 can comprise an engagement surface for the locking mechanism to make contact against.

Figure 15:
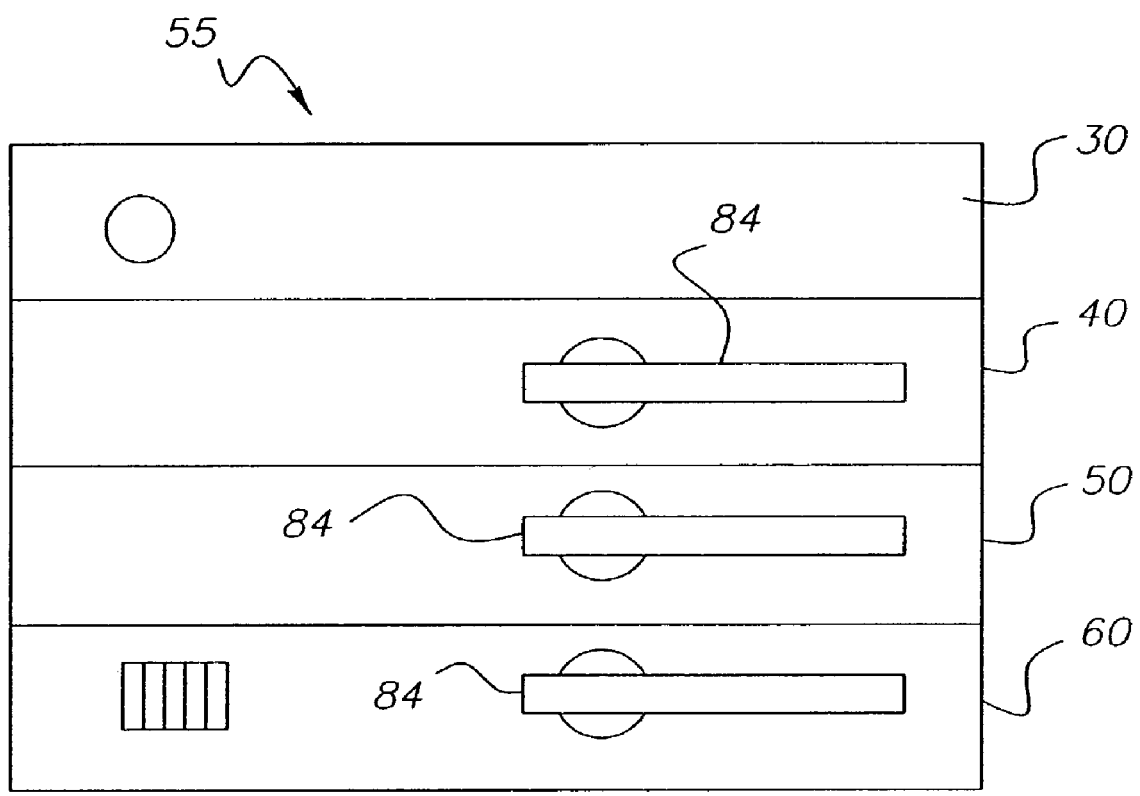
FIG. 15 shows a backside of the modular digital imaging system of FIG. 6.

In a preferred embodiment, attachment opening 82 and female portion 74 are protected by a cover from dust/dirt/debris when not being employed. When the module is to be docked with another module, the cover is moved to provide access to attachment opening 82 and female portion 74. FIG. 12 shows a lever 84 in an open position wherein attachment opening 82 and female portion 74 are accessible. FIG. 13 shows lever 84 in a closed position wherein attachment opening 82 and female portion 74 are not accessible for docking. However, once docked with another module, lever 84 can be moved to the closed position to secure/capture the module with another module. FIG. 15 shows a backside of digital imaging system 55 illustrating a plurality of levers 84 in the closed position.

Once docked, the electrical connection of the module is made with the other modules, particularly display module 30 which provides an interface to display device 10.

In a preferred embodiment, the user interface for digital imaging system 35, 55 is not contained with module 40, 50, 60. Rather, user control would be provided by display device 10 or display module 30. Accordingly, each time a module 40, 50, 60 is docked, software for the module would be uploaded or accessed by display device 10 or display module 30. This software may be uploaded from firmware within the modules or via the communications link 38 or via the removable digital memory device 16. As such, a cumulative user interface is provided. The user interface can be designed with a consistent look and feel for all modules added to the system.

Further, with such an arrangement, the user interface of digital imaging system 35, 55 could be changed/modified by changing a display/screen of display device 10. That is, different features could be accessible or not accessible depending on the display/screen of display device 10. For example, for a new user of a digital camera, a limited feature set could be provided whereas for a professional photographer, a more advanced feature set could be provided. In another example, display device 10 provides zoom and crop features only when a particular display/screen is used.

With the modules docked, the modules can be monitored and managed. For example, power management can be monitored, and power shifted to different modules as required. For example, printing images may be suspended during the time a CD is being written. In another example, memory can be shared between modules as required for example for queuing a large number of images or long segment of video.

Display module 30 can comprise more than one support member 34 to accommodate more than one display device 10. For example, it may be desired to charge more than one display device 10 at one time. Indeed, support member 34 (i.e., display module 30) can be configured to accept/receive more than one type/model of display device. Additionally, display devices 10 may be able to share data when connected to display module 30.

When display device 10 is docked within support member 34 of display module 30, CD module 40 can be configured to automatically download to a CD all new images stored on digital storage device 16 or newly transmitted images to display device 10 by means of a communication network. Printer module 50 can be likewise configured so that new images are automatically printed. The modules may store the filenames or other identification of digital data files that have been stored or printed so as to facilitate the identification of new digital data files for storage or printing. This technique may also be used for sharing images by means of the communications link 38.

As shown in FIG. 3, display device 10 operates in a display mode when docked in display module 30.

Figure 16:
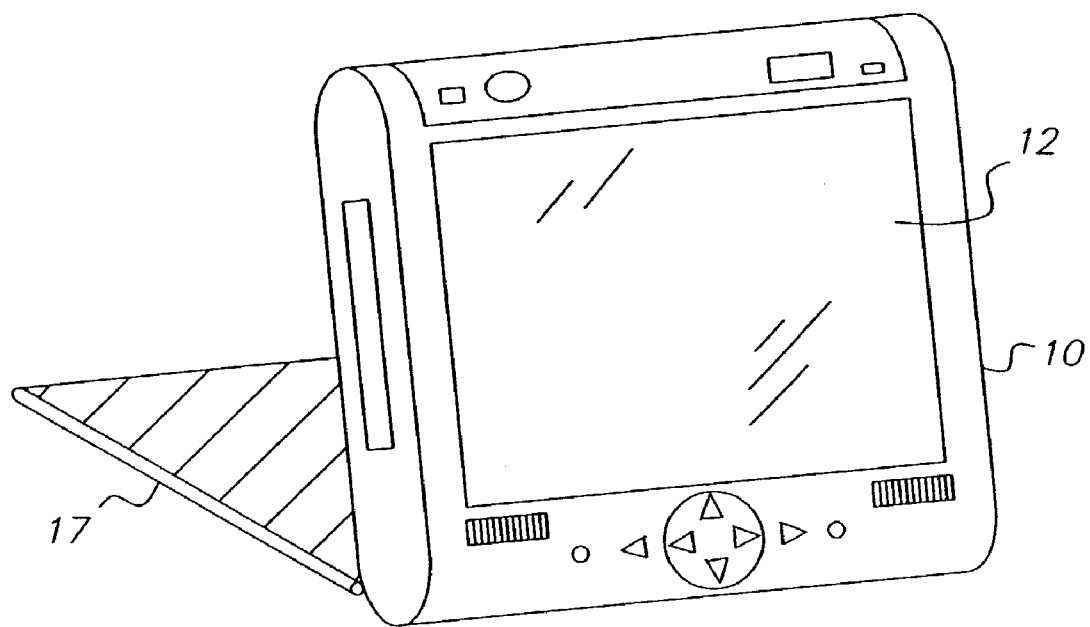
FIG. 16 shows a perspective view of the display device in a display mode.

Referring now to FIG. 16, cover member 17 can be employed as a stand or support device so that display device 10 can be supported without the use of display module 30. Alternatively, cover member 17 can be moved to partially or completely cover display 12, as shown in FIG. 17, thereby providing protection, shock absorption, and/or shielding of display 12, such as may be desired during transport or shipping.

If display device 10 is a digital camera (i.e., is adapted to capture images), then cover member 17 would be positioned as shown in FIG. 1 during the capture of an image.

Figure 17:
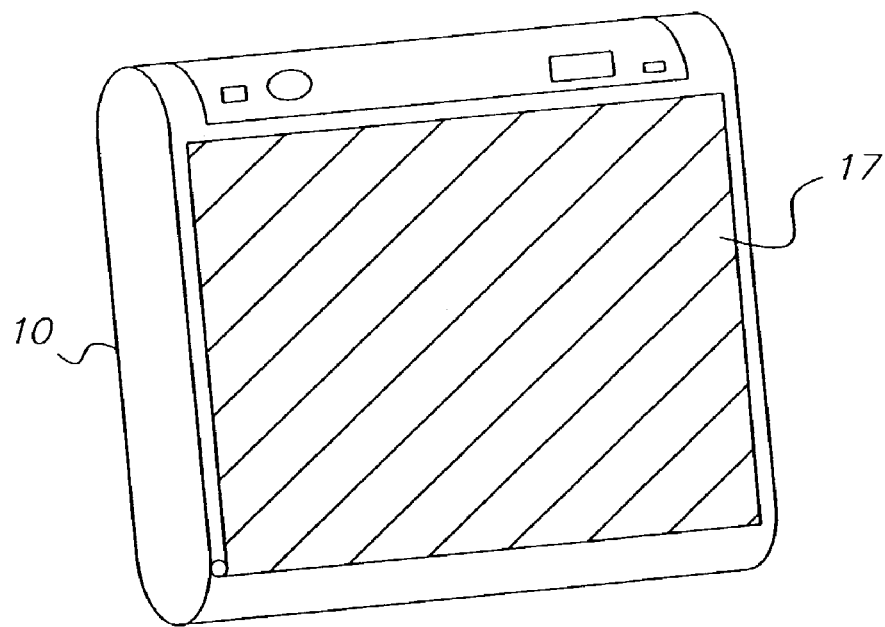
FIG. 17 shows a perspective view of the display device with the cover member covering the display.
Figure 18:
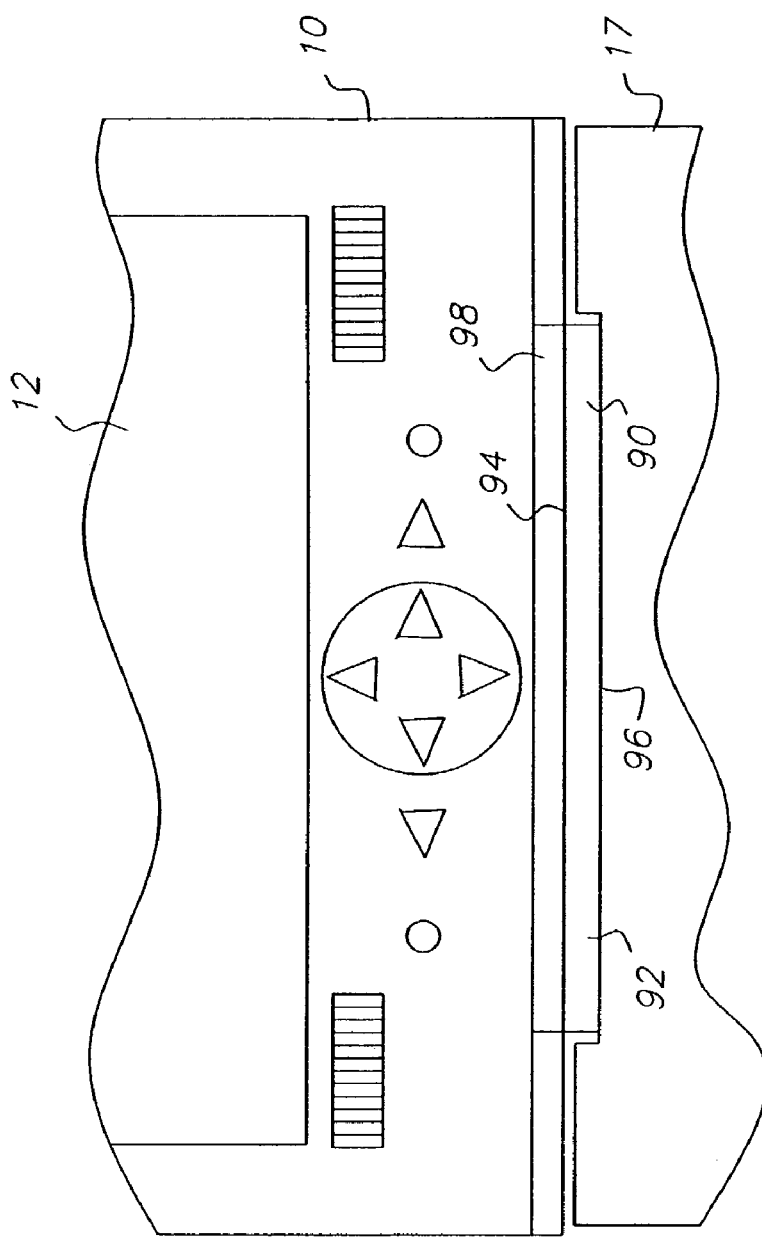
FIG. 18 shows a front view of a hinge mechanism hinging the cover member to the display device.
Figure 19:
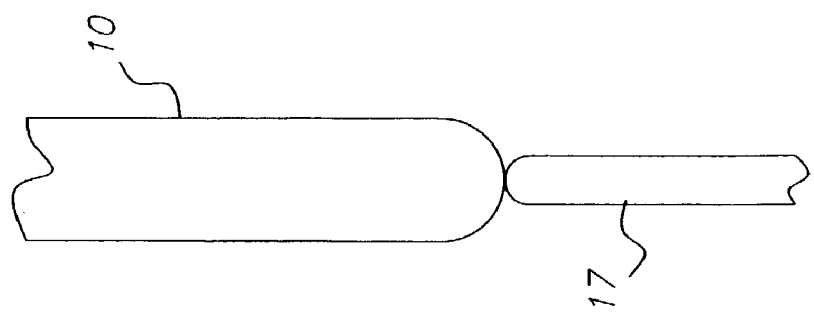
FIG. 19 shows a side view of FIG. 18.
Figure 23A:
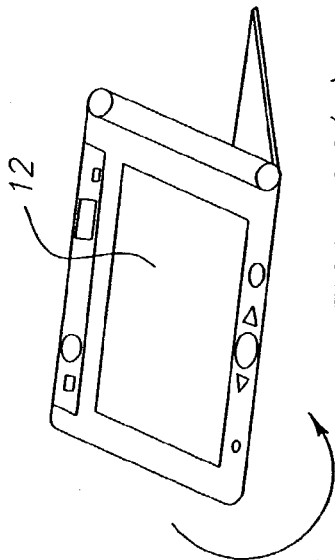
FIG. 23(a) through (g) shows the movement of the cover member relative to the display device.
Figure 23B:
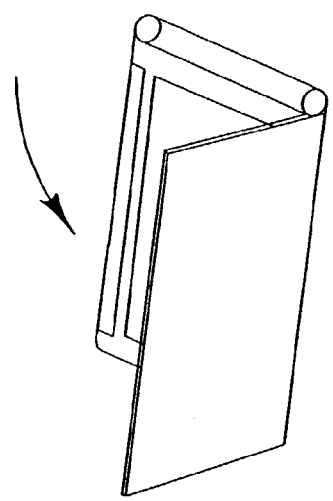
Figure 23C:
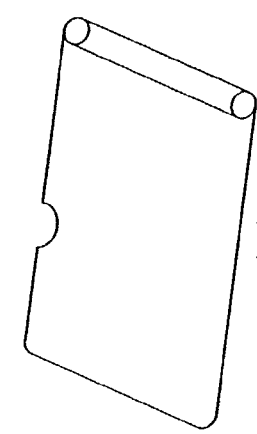
Figure 23D:
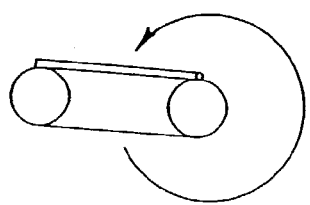
Figure 23E:
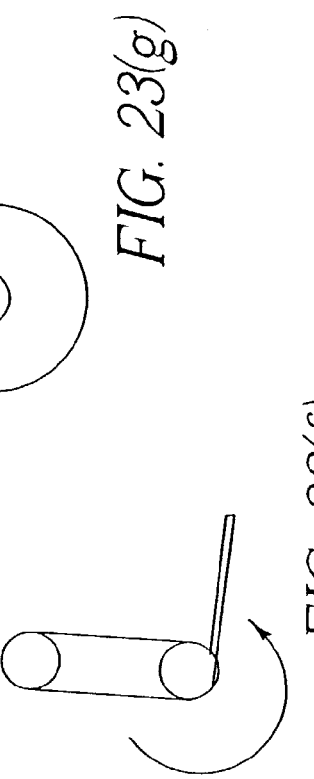
Figure 23F:
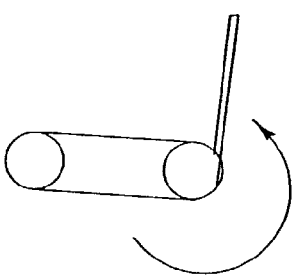
Figure 23G:
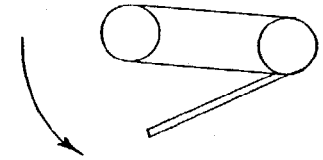

As such, cover member 17 has three positions for three modes of operation: a camera mode (shown in FIG. 1), a display mode (shown in FIG. 16), and a protection/closed mode (shown in FIG. 17).

Referring now to FIGS. 18 through 22, cover member 17 comprises a dual hinged mechanism for movement between the three modes. Hinged mechanism 90 comprises a hinge 92 pivotally connected to display device 10 along a first hinge edge 94 and pivotally connected to cover member 17 along a second hinge edge 96. A connection portion 98 of display device 10 pivotally connected to hinge 92 along first hinge edge 94 is configured to rotate/pivot about an axis directed along first hinge edge 94. Similarly, cover member 17 is configured to rotate/pivot about an axis directed along second hinge edge 96. Each hinge can be operated independent of the other.

Hinged mechanism 90 provides for the movement of cover member 17 between the three modes. FIGS. 20 through 22 show a side view of display device 10 with cover member 17 disposed in the three modes. As shown in FIGS. 20 and 21, the thickness of display device 10 remains constant when cover member 17 is disposed on either side of the display device. As such, display device 10 can be positioned within support member 34 of display module 30 when cover member 17 is in the positions shown in FIGS. 20 and 21. When cover member 17 is placed adjacent a support surface, display 12 is viewable by a user. The angle $\alpha$ formed between display 12 and cover member 17 can be adjusted by a user for optimal viewing of display 12 by the user.

Cover member 17 may comprise a coating on one or more sides. For example, as shown in FIG. 22, one side of cover member 17 includes a coating 95. In the display mode shown in FIG. 22, coating 95 provides a non-skid, non-slip feature to secure display device 10. When cover member 17 is in the closed mode (FIG. 20), the same coating 95 provides shock absorption and protection for display 12 as well as a moisture shield. When cover member 17 is in the camera mode (FIG. 21), the same coating 95 provides a gripping, non-slip feature for grasping display device 10.

Materials which are suitable for use as coating 95 are known to those skilled in the art, and can comprise polymers, non-slip polymers, rubber materials, polyurethane materials, non-transfer adhesives.

FIGS. 23(a) through (g) provide another illustration of the movement of cover member 17 relative to display 12, and positioning display device 10 into the three modes of operation.

Figure 24:
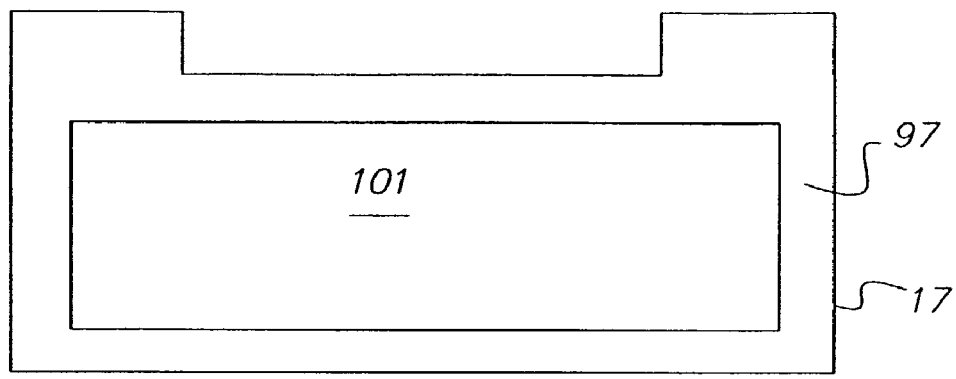
FIG. 24 shows a top view of a cover member comprising a transparent portion and an opaque portion.

Cover member 17 is shown as being opaque, such as being comprised of a metal or rigid plastic. However, portions of or all of cover member 17 may be transparent, whereby display 12 would be visible when cover member 17 is disposed in front of display 12. For example, FIG. 24 generally illustrates cover member 17 having an opaque portion 97 and a transparent portion 101, such as comprised of a transparent plexiglass or rigid plastic. Transparent portion 101 may be configured such that the display 12 remains at least partially visible. During capture mode, cover member 17 can protect display 12 while being used as a viewfinder.

The position of cover member 17 can automatically provide the mode of operation of display device 10. That is, automatic mode detection can be determined by the position of cover member 17. For example, moving cover member 17 to the camera mode would automatically activate the power of display device 10. Similarly, when cover member 17 is moved to the closed mode, display device 10 may be automatically powered down. Likewise, when cover member 17 is moved to the closed mode, other features of display device 10 may automatically powered down or moved/rotated to a "closed/off" position. For example, flash member 22 (shown in FIG. 1) may be moved/rotated to a covered/shut position when cover member 17 is moved to the closed mode.

Figure 25:
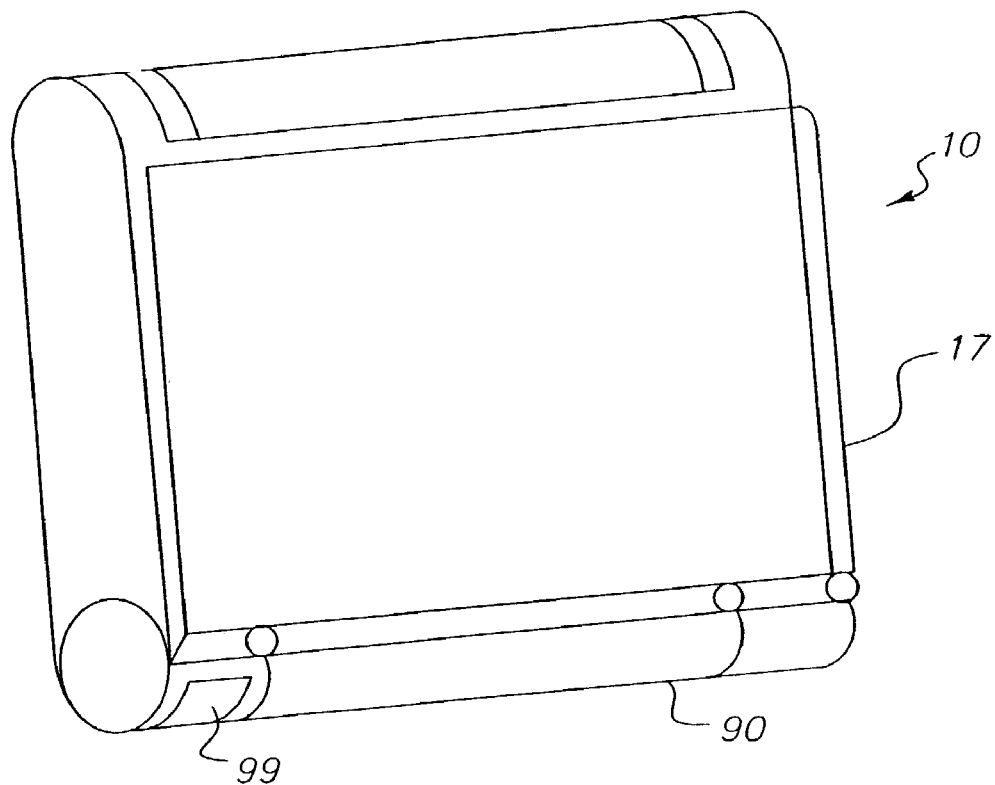
FIG. 25 shows a perspective with of the display device illustrating the hinged mechanism and a USB port location.
Figure 27:
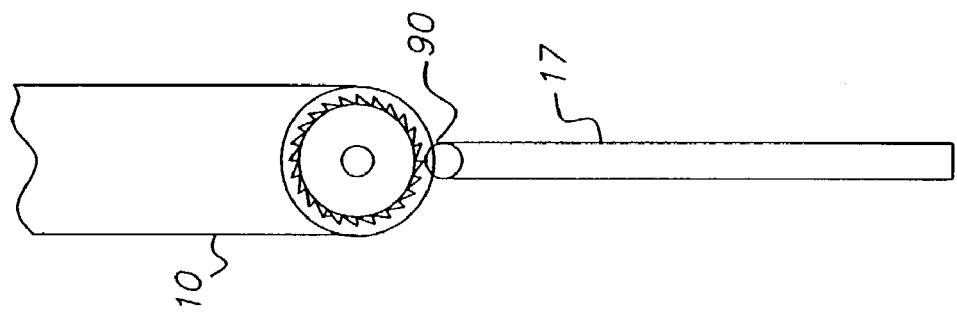
FIG. 27 shows a side view of FIG. 26.
Figure 26:
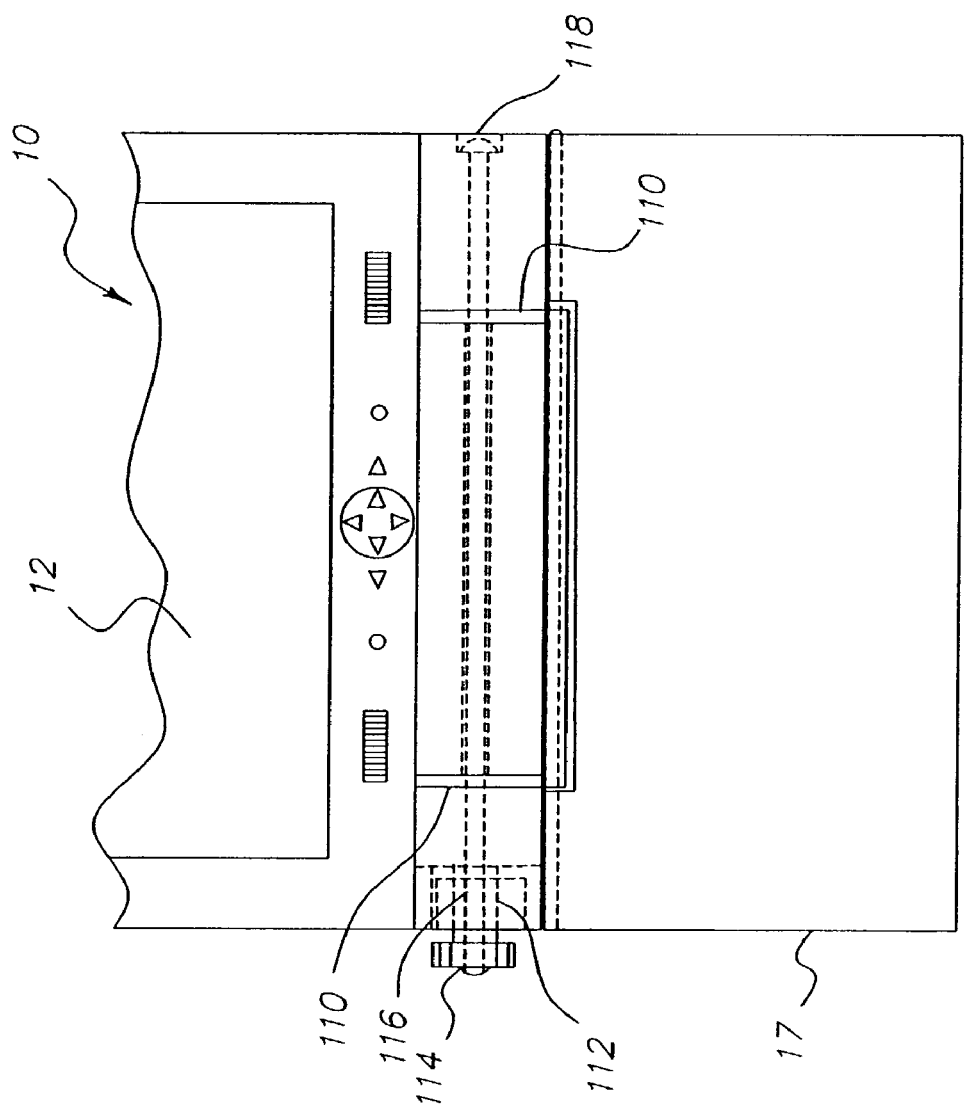
FIG. 26 shows a front view of the display device and cover member employing a hinged mechanism comprising a clutch.
Figure 28:
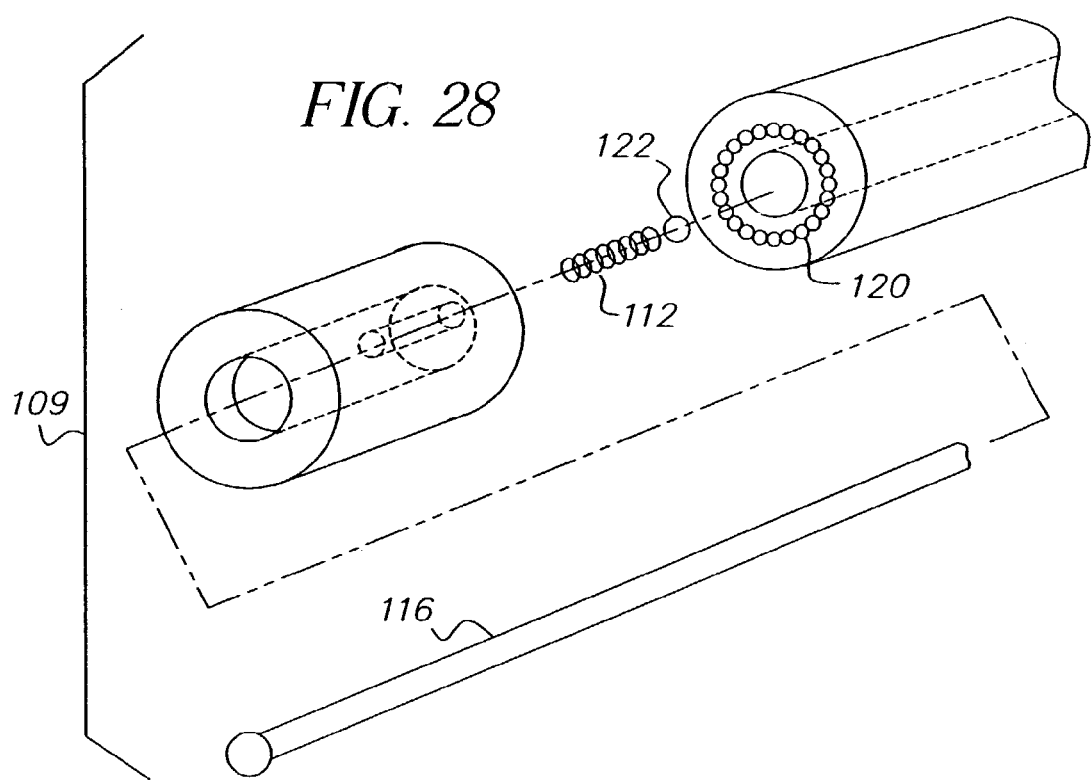
FIGS. 28–31 show a perspective view of roller bearing elements.
Figure 29:
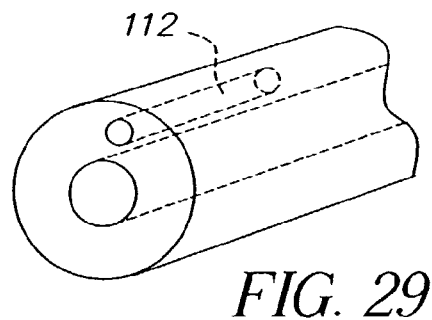
Figure 30:
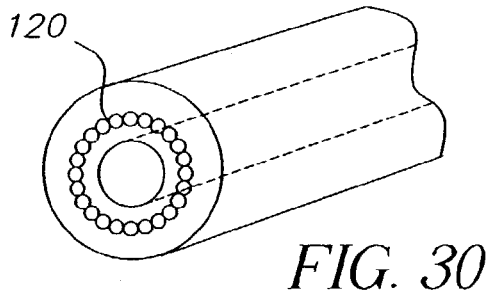
Figure 31:
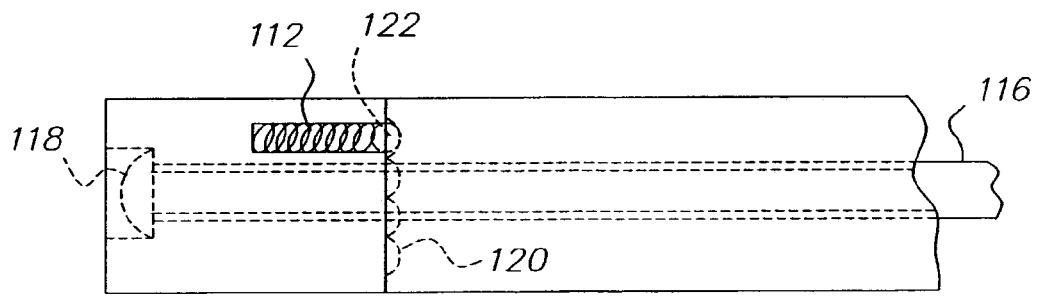

Other arrangements for hinged mechanism 90 may be known to those skilled in the art. For example, FIG. 25 shows cover member 17 in the closed mode, wherein a portion of cover member 17 is hinged, thereby permitting a stationary USB connection 99 to be disposed along a stationary (non-rotatable) bottom edge of display device 10.

FIGS. 26 through 31 show alternate arrangements for hinged mechanism 90. As illustrated, a clutch is employed comprising a clutch pad 110, spring 112, thumbwheel 114, threaded shaft 116, and a nut/cavity 118. Thumbwheel 114 is loosened or tightened for spacing of clutch pad 110. Clutch pad 110 can be comprised of Teflon or similar materials. Detents 120 and ball probe 122 can be employed to provide discrete movement of the cover member, as shown in FIGS. 28 through 31.

Those skilled in the art will recognize that other types of clutches can be employed, for example, pressure clutches, magnetic clutches, friction clutches, and interference fit.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

| | | | |
|---|---|---|---|
| 10 | display device | 72 | bottom side |
| 12 | display | 74 | female electrical connection portion |
| 13 | speaker | | |
| 14 | receiving port | 75 | top side |
| 16 | digital storage device | 76 | top side |
| 17 | cover member | 76 | male electrical connection portion |
| 18 | selection members | | |
| 20 | aperture; for stylus | 78 | footer receiving area; detent |
| 22 | flash member/ illumination device | | |
| | | 80 | attachment member |
| 24 | communication port | 82 | attachment opening |
| 26 | lower edge | 84 | lever |
| 30 | display module | 90 | dual hinged mechanism |
| 32 | body | | |
| 34 | support member | 92 | hinge |
| 35 | digital imaging system | 94 | first hinge edge |
| 36 | recess | 95 | coating |
| 37 | electrical connector | 96 | second hinge edge |
| 38 | telephone connector/ communications link | 97 | opaque portion |
| | | 98 | connection portion |
| 40 | CD module | 99 | USB connection |
| 42 | opening | 101 | transparent portion |
| 50 | printer module | 110 | clutch pad |
| 52 | hardcopy print | 112 | spring |
| 54 | delivery aperture | 114 | thumb wheel |
| 55 | digital imaging system | 116 | threaded shaft |
| 60 | other module | 118 | nut/cavity |
| 62 | display recess | 120 | detents |
| 70 | module support members; footers | 122 | ball probe |

What is claimed is:

1. A modular digital imaging system adapted to transfer digital images, comprising:

a plurality of modules which are stackable to form a customizable unit;

a first one of the plurality of modules providing a first function and having a first electrical connector, at least one attachment member, and a body having planar support surface surrounding a recessed area and a movable support member positioned within said recessed area for receiving a removable display device;

a second one of the plurality of modules providing a second function different than the first function and having a second electrical connector matable with the first electrical connector, the second module further comprising at least one attachment feature complementing the attachment member whereby the at least one attachment member mates with the at least one attachment feature to securely attach the first and second modules when the first and second modules are stacked; and wherein the electrical connector is employed to transfer the digital images between modules when securely attached.

2. The system according to claim 1, wherein the first and second modules have substantially the same length and width.

3. The system according to claim 1, wherein the attachment feature is an opening.

4. The system according to claim 1, further comprising a plurality of footers disposed on a base side of the first module to support the first module.

5. The system according to claim 4, further comprising a plurality of detents disposed on a top side of the second module adapted to receive the plurality of footers.

6. The system according to claim 5, wherein the plurality of footers and the plurality of detents have complementary shapes.

7. The system according to claim 4, wherein the plurality of footers are comprised of an elastic material capable of compression and friction.

8. The system according to claim 1, further comprising a user-operated locking member to secure the attachment member and the attachment feature.

9. The system according to claim 8, wherein the locking member is a lever movable between a locking position and un-locked position.

10. The system according to claim 1, further comprising a third one of the plurality of modules providing a third function different than the first and second functions and having a third and fourth electrical connectors disposed on a top and bottom surface, and having at least one attachment member and at least one attachment feature, whereby the third module is disposable intermediate the first and second modules when stacked, and the attachment members and attachment features mate to securely attach the first, second, and third modules when the modules are stacked.

11. The system according to claim 1, wherein one of the first or second modules provides electrical power to the other module.

12. The system according to claim 1, wherein the first or second function is a printing function.

13. The system according to claim 1, wherein the first or second function is a display function.

14. The system according to claim 1, wherein the first or second fraction is a DVD writing function.

15. The system according to claim 1, wherein the first or second function is a telecommunication function.

16. The system according to claim 10, further comprising a fourth one of the plurality of modules having an area for storage of an accessory and having at least one attachment member or at least one attachment feature.

17. The system according to claim 16, wherein the area has a predetermined size sufficient to store a battery, manual, electrical cable, or memory card.

18. The system according to claim 16, further comprising a fifth one of the plurality of modules having an area for receiving a digital image capture device, and having at least one attachment member or at least one attachment feature whereby the fifth module is stacked on top of the first and second modules.

19. The system according to claim 18, wherein the fifth comprises two electrical connectors, one of the two electrical connectors connects with the first electrical connector of the first module or the second electrical connector of the second module, and the other of the two connectors connects with an electrical connector on the digital image capture device.

20. The system according to claim 18, wherein the fifth module further provides power to the digital image capture device.

21. The system according to claim 19, wherein the first and second functions include a DVD writing function and a printing function.

22. The system according to claim 1, wherein each of the plurality of modules includes the at least one attachment member and the at least one attachment feature, the at least one attachment member being disposed on a first side of the module, the at least one attachment feature being disposed on a second side of the module opposite the first side.

23. The system according to claim 1, wherein each of the plurality of modules includes a plurality of footers disposed on a first side and a plurality of detents disposed on a second side, the footers and detents having complementing shapes, the plurality of footers of the first one of the plurality of modules being adapted to mate with the plurality of detents of the second one of the plurality of modules to position the first and second modules in a first stacked configuration, the plurality of detents of the first one of the plurality of modules being adapted to mate with the plurality of footers of the second one of the plurality of modules to position the first and second modules in a second stacked configuration.

24. A modular digital imaging system adapted to transfer digital images, comprising:
 a plurality of modules which are stackable to form a customizable unit;
 a first one of the plurality of modules providing a first function and having a first electrical connector, at least one locating member, and a body having planar support surface surrounding a recessed area and a movable support member positioned within said recessed area for receiving a removable display device;
 a second one of the plurality of modules providing a second function different than the first function and having a second electrical connector matable with the first electrical connector, the second module further comprising at least one locating feature complementing the locating member whereby the at least one locating member mates with the at least one locating feature to position the first and second modules in a stack; and
 wherein the electrical connector is employed to transfer the digital images between modules when stacked.

25. The system according to claim 24, wherein the at least one locating member comprises a footer disposed on a base side of the first module.

26. The system according to claim 25, wherein the at least one locating feature is a detent disposed on a top side of the second module.

27. The system according to claim 25, further comprises a plurality of footers, each footer comprised of an elastic material capable of compression and friction.

28. The system according to claim 24, further comprising a third one of the plurality of modules providing a third function different than the first and second functions and having a third and fourth electrical connectors disposed on a top and bottom surface, and having at least one locating member and at least one locating feature, whereby the third module is disposed intermediate the first and second modules when stacked, and the locating members and locating features position the first, second, and third modules in a stack.

29. The system according to claim 24, wherein one of the first or second modules provides electrical power to the other module.

30. The system according to claim 24, wherein the first or second function is a printing function.

31. The system according to claim 24, wherein the first or second function is a display function.

32. The system according to claim 24, wherein the first or second function is a DVD writing function.

33. The system according to claim 24, wherein the first or second function is a telecommunication function.

34. The system according to claim 24, further comprising a fourth one of the plurality of modules having an area for storage of an accessory and having at least one locating member or at least one locating feature.

35. The system according to claim 34, wherein the area has a predetermined size sufficient to store a battery, manual, electrical cable, or memory card.

36. The system according to claim 24, further comprising a fifth one of the plurality of modules having an area for receiving a digital image capture device, and having at least one locating member or at least one locating feature whereby the fifth module is stacked on top of the first and second modules.

37. The system according to claim 36, wherein the fifth comprises two electrical connectors, one of the two electrical connectors connects with the first electrical connector of the first module or the second electrical connector of the second module, and the other of the two connectors connects with an electrical connector on the digital image capture device.

38. The system according to claim 36, wherein the fifth module further provides power to the digital image capture device.

39. The system according to claim 36, wherein the first and second functions include a DVD writing function and a printing function.

40. A modular digital imaging device, comprising:
a body including a first side having a first shape and a second side having a second shape, the first shape being complementary to the second shape, and including a planar support surface surrounding a recessed area and a movable support member positioned within said recessed area for receiving a removable display device;
a functional member disposed within the body providing a function accessible from a third side different than the first and second side;
an electrical connection portion adapted to support electrical operation of the modular imaging device and electrically connect the modular imaging device to another modular imaging device; and
at least one alignment member disposed on the first side for aligning the modular imaging device with another modular imaging device.

41. The modular digital imaging device of claim 40, further comprising at least one locating member disposed on the second side for supporting the modular imaging device.

42. The modular digital imaging device of claim 40, wherein the functional member provides a printing function.

43. The modular digital imaging device of claim 40, wherein the functional member provides a CD or DVD writing or reading function.

44. The modular digital imaging device of claim 40, wherein the functional member provides a storage function.

45. The modular digital imaging device of claim 40, wherein the functional member provides a telecommunication function.

46. The modular digital imaging device of claim 40, wherein the electrical connection has a receiving portion disposed on one of the first and second sides; and a projecting portion on the other of the first and second sides.

* * * * *

UNITED STATES PATENT AND TRADEMARK OFFICE
CERTIFICATE OF CORRECTION

PATENT NO. : 7,170,557 B2  Page 1 of 1
APPLICATION NO. : 10/393834
DATED : January 30, 2007
INVENTOR(S) : Joseph A. Manico et al.

It is certified that error appears in the above-identified patent and that said Letters Patent is hereby corrected as shown below:

Col. 11, line 37 "fraction" should read --function--

Col. 14, line 28 "sides;" (first occurrence) should read --sides,--

Signed and Sealed this

Seventh Day of August, 2007

JON W. DUDAS
*Director of the United States Patent and Trademark Office*